(12) United States Patent
Jebari

(10) Patent No.: US 11,359,705 B2
(45) Date of Patent: Jun. 14, 2022

(54) MACHINE GENERATING CENTRIFUGAL FORCES FROM EFFECTIVE ELLIPTIC TRAJECTORY

(71) Applicant: Jamel Jebari, Cluny (FR)

(72) Inventor: Jamel Jebari, Cluny (FR)

( * ) Notice: Subject to any disclaimer, the term of this patent is extended or adjusted under 35 U.S.C. 154(b) by 683 days.

(21) Appl. No.: 16/312,868

(22) PCT Filed: Jun. 23, 2017

(86) PCT No.: PCT/CA2017/000156
§ 371 (c)(1),
(2) Date: Dec. 21, 2018

(87) PCT Pub. No.: WO2017/219117
PCT Pub. Date: Dec. 28, 2017

(65) Prior Publication Data
US 2019/0323587 A1    Oct. 24, 2019

Related U.S. Application Data

(60) Provisional application No. 62/354,055, filed on Jun. 23, 2016.

(51) Int. Cl.
*F16H 33/20*        (2006.01)
*F03G 7/10*         (2006.01)
(Continued)

(52) U.S. Cl.
CPC .............. *F16H 33/20* (2013.01); *F03G 7/10* (2013.01); *F16F 15/14* (2013.01); *F03G 3/00* (2013.01);
(Continued)

(58) Field of Classification Search
CPC . F16H 33/20; F16H 21/34; F03G 7/10; F03G 3/00; F16F 15/14; F16C 3/18; F16C 2/22
See application file for complete search history.

(56) References Cited

U.S. PATENT DOCUMENTS 4,095,460 A * 6/1978 Cuff ..................... B06B 1/167
                                                   74/84 S
4,238,968 A * 12/1980 Cook ..................... F03G 3/00
                                                   74/84 R
(Continued)

FOREIGN PATENT DOCUMENTS

CN       102767490 A    11/2012
JP      2004270672 A     9/2004
(Continued)

*Primary Examiner* — David M Fenstermacher
(74) *Attorney, Agent, or Firm* — PRAXIS

(57) ABSTRACT

A generator (100) and/or machine (110) generating mechanical energy and functioning on the principle of exploitation of an energy allowing the existence of centrifugal forces (Fc) on masses (120) being displaced in rotation, into an effective elliptic trajectory (150), about a respective shaft (128) freely rotatably mounted on a plate (122) itself freely rotatably mounted on a main shaft (202) freely rotatably mounted on a fixed chassis (140). The centrifugal forces generated by the masses (120) transmit a rotational oscillating movement of the plate (122) transferred by a mechanical energy transmission mechanism into a continuous rotation movement to an output torque mechanism freely mounted on the main shaft (202).

20 Claims, 5 Drawing Sheets

(51) Int. Cl.
*F16F 15/14* (2006.01)
*F03G 3/00* (2006.01)
*F16C 3/18* (2006.01)
*F16C 3/22* (2006.01)
*F16H 21/34* (2006.01)

(52) U.S. Cl.
CPC ..... *F16C 3/18* (2013.01); *F16C 3/22* (2013.01); *F16H 21/34* (2013.01)

(56) References Cited

U.S. PATENT DOCUMENTS

| | | | | |
|---|---|---|---|---|
| 4,261,212 A | * | 4/1981 | Melnick | F03G 3/00 74/84 R |
| 4,347,752 A | * | 9/1982 | Dehen | F03G 3/08 74/117 |
| 4,479,396 A | * | 10/1984 | deWeaver, III | F03G 3/00 180/7.1 |
| 4,631,971 A | * | 12/1986 | Thomson | F03G 3/00 74/84 R |
| 4,712,439 A | * | 12/1987 | North | F03G 3/00 74/61 |
| 5,150,626 A | * | 9/1992 | Navarro | F03G 3/00 74/61 |
| 5,937,698 A | | 8/1999 | Kunz | |
| 2003/0047015 A1 | | 3/2003 | Kim | |
| 2004/0219007 A1 | | 11/2004 | Tavarez | |
| 2018/0003276 A1 | | 1/2018 | Jebari | |

FOREIGN PATENT DOCUMENTS

| | | |
|---|---|---|
| WO | 9213193 A1 | 8/1992 |
| WO | 9146584 A2 | 6/2001 |
| WO | 2016101062 A1 | 6/2016 |

* cited by examiner

MACHINE GENERATING CENTRIFUGAL FORCES FROM EFFECTIVE ELLIPTIC TRAJECTORY

CROSS REFERENCE TO RELATED APPLICATIONS

This application claims priority of U.S. Provisional Application for Patent No. 62/354,055 filed Jun. 23, 2016, the content of which is incorporated herein by reference in its entirety.

FIELD OF THE INVENTION

The present invention relates to the functioning principle of machines generating mechanical energy from energy being the basis or ground of the accelerated expansion of our Universe, and more specifically from centrifugal forces, and more particularly for generating a rotating movement from oscillating rotating plates.

BACKGROUND OF THE INVENTION

As well explained in the background section of PCT patent application No. PCT/CA2015/000614 to Mr. Jamel Jebari, filed on Dec. 22, 2015, and published under Publication No. WO 2016/101062A1 on Jun. 30, 2016, which is incorporated herein by reference, there exist machines/generators functioning on the principle of exploiting centrifugal forces. More specifically, in that same publication, there is an embodiment represented in FIGS. 51 to 54 in which the centrifugal forces generated by the rotating masses are to be directly transmitted from the masses to the oscillating rotating plates (oscillating about a main shaft of the rotor) via direct contact there between along perimeters of bores receiving the masses therein. The centrifugal forces are not transmitted to the plate via the rotating shaft about which the masses rotate, since the masses are free to move (or slide) radially relative to the rotating shafts, which could be simpler to design and manufacture.

Accordingly, there is a need for a generator of centrifugal forces from effective elliptic trajectory with simpler design, and the machine made therewith.

SUMMARY OF THE INVENTION

It is therefore a general object of the present invention to provide a generator of centrifugal forces from effective elliptic trajectory with simpler design, and the machine made therewith.

It is noted that for the purpose of the present application, an effective elliptic trajectory refers to any closed trajectory having an effective varying radius relative to a moving center of rotation, as it may include, as an example, but not limited to, a circular trajectory about a center of rotation oscillating about a main axis. Furthermore, the trajectory, unless specifically mentioned otherwise, is intended to be the trajectory of the center of inertia (or gravity) of the mass of the body following the trajectory. Furthermore, the body following the trajectory could be any type of body, including a solid body (or a plurality of bodies), a fluid (liquid and/or gaseous), or any combination thereof, depending on the embodiment of the invention being considered.

The present invention refers to a generator of centrifugal forces from effective elliptic trajectory (GCFEET) or a machine (MGCFEET) including at least one such GCFEET.

An advantage of the present invention is that the generator (GCFEET) and/or machine (MGCFEET) uses the centrifugal forces (Fc) generated onto masses (M) to provide available output power (or torque), without the use of any drawback such as availability of the power source, weather condition or the like, since the centrifugal forces (Fc) are always available, wherever on the entire Universe.

A further advantage of the present invention is that the generator (GCFEET) and/or machine (MGCFEET), with oscillating rotating movement, can generate electrical energy by having the power torque feeding an electric generator, and/or can be an engine for all types of ground vehicles and others.

Yet a further advantage of the present invention is that the generator (GCFEET) and/or machine (MGCFEET) exploits a source of energy which: is endless; is everywhere in the Universe (therefore exploitable outside of the atmospheric environment, and no need of carrying it); is completely green (without any pollution while operating); is easy to access; is usable by everyone; and is free (of charge).

According to an aspect of the present invention, there is provided a generator of centrifugal forces from an effective elliptic trajectory for mounting on a chassis having a main shaft freely rotatably mounted thereon and a mechanical energy transmission mechanism mounted thereon, said generator comprising:
  a rotating shaft for freely rotatably mounting on a rotating shaft plate of the mechanical energy transmission mechanism freely rotatably mounted on the main shaft, said rotating shaft fixedly connecting to and driving in rotation at least one mass there about, said rotating shaft plate and the mechanical energy transmission mechanism being adapted to be displaced in rotational oscillation by and carry at least a portion of a centrifugal force (Fc) generated by said at least one mass when said at least one mass is displaced in rotation about said rotating shaft to transmit said at least a portion of a centrifugal force (Fc) to a torque output mechanism; and
  a shaft driving system selectively driving the rotating shaft and the at least one mass connected thereto.

According to another aspect of the present invention, there is provided a machine generating mechanical energy by exploiting the generation of centrifugal forces (MGCFEET) typically comprising:
  a chassis having a main shaft freely rotatably mounted thereon;
  a mechanical energy transmission mechanism mounted thereon; and
  at least one generator as defined hereinabove freely rotatably mounting on the rotating shaft plate of the mechanical energy transmission mechanism, said rotating shaft fixedly connecting to and driving in rotation at least one mass there about, said rotating shaft plate and the mechanical energy transmission mechanism being displaced in rotational oscillation by and carry at least a portion of a centrifugal force (Fc) generated by said at least one mass when said at least one mass is displaced in rotation about said rotating shaft to transmit said at least a portion of a centrifugal force (Fc) to a torque output mechanism, said at least one generator including a shaft driving system selectively driving the rotating shaft and the at least one mass connected thereto;
  wherein said at least a portion of the centrifugal force (Fc) being available at said torque output mechanism for transmission as an output energy from said machine generating mechanical energy by exploiting the generation of centrifugal forces.

Conveniently, the machine includes a pair of rotating shaft plates freely rotatably mounted onto the main shaft and operatively connecting to the torque output mechanism via a sprocket/gear assembly including first and second sprocket shafts operatively connected to respective first and second wheel sprockets and respective first and second gears of the mechanical energy transmission mechanism, each one of said pair of rotating shaft plates operatively engaging said sprocket/gear assembly when rotating in opposite directions and being operatively disengaged therefrom when rotating in a respective reverse direction, each one of said first sprocket shafts operatively connecting on one said pair of rotating shaft plates including a respective rotational direction reversing member, each one of said at least one generator mounting onto a respective one said pair of rotating shaft plates being selectively angularly oriented relative to one another so as to allow said pair of rotating shaft plates to have a rotational oscillating movement about the main shaft.

In one embodiment, the machine further includes a plate circumferential biasing mechanism hingeably connecting to the chassis and the rotating shaft plate and biasing the rotating shaft plate into a neutral rotational position of the rotational oscillating movement thereof relative to the chassis.

Conveniently, the plate circumferential biasing mechanism is at least one tension coil spring laying within a plane substantially parallel to a plane of the rotating shaft plate.

In one embodiment, each plate of said pair of rotating shaft plates including a pair of axially spaced apart united plates (or hollow disk) receiving respective ones of said at least one mass therebetween.

In one embodiment, the shaft driving system includes at least one electric motor connecting to and selectively driving the at least one rotating shaft.

Conveniently, the machine includes a plurality of generators with respective said rotating shaft, and wherein the shaft driving system includes a plurality of electric motors, each one of said plurality of electric motors connecting to and selectively driving a respective said rotating shaft.

In one embodiment, the first and second sprocket shafts, with the respective first and second wheel sprockets and the respective first and second gears of the sprocket/gear assembly of the mechanical energy transmission mechanism being mounted into a circumferentially alternating fashion and/or substantially circumferentially equally spaced apart from one another around the lower plates.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

DETAILED DESCRIPTION OF THE INVENTION

Figure 1:
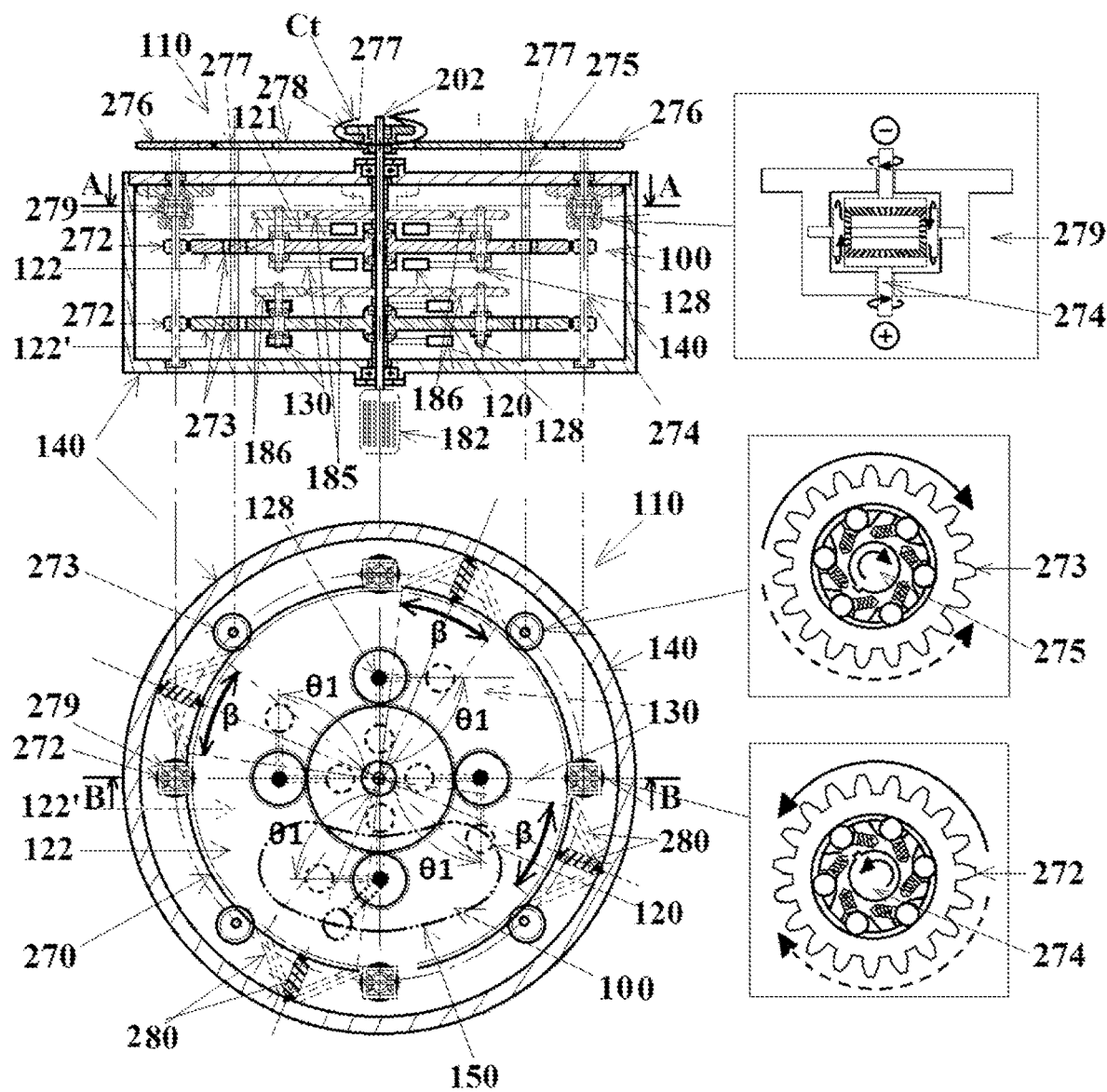
FIG. 1 are schematic plan and elevation views of a machine generating centrifugal forces from effective elliptic trajectory (MGCFEET) (110) with oscillating rotational movement, including eight generators of centrifugal forces from effective elliptic trajectory (GCFEETs) (100) (four (4) per lower plate (122, 122')) (similar to that of FIG. 8 of PCT Publication No. WO 2016/101062A1, incorporated herein by reference), each one having a pair of masses (120) rotating about its rotating shaft (128); each lower plate (122, 122') includes gear teeth at its outer periphery that mesh with two series of free wheel sprockets (272, 273) mounted on respective sprocket shafts (274, 275); each sprocket shaft also carries an intermediate gear (276, 277) that meshes with an output gear (278) for transmission of the generated power torque generated by the GCFEETs (100) via an rotational oscillation of the lower plates due to the masses (120); one series of sprocket shafts are connected to their respective intermediate gear via a rotational direction reversing member (279), and each series of sprocket shafts are adapted to transmit the generated torque via the free wheel sprockets adapted to freely rotate in opposite directions from one series to another.

When a mass 120 rotates about a rotating shaft 128 within a circular trajectory, the mass 120 generates a centrifugal force (Fc) of uniform value and centrally oriented (in a direction extending through the center of rotation of the mass) relative to the rotating shaft 128 at each and every point of its trajectory. The principle of a generator of centrifugal forces from an effective elliptic trajectory (GCFEET) 100 in accordance with an embodiment of the present invention consists in forcing such a mass 120, fixedly secured the rotating shaft 128 via a radial bar 121 or the like to move within and along an effective 'elliptic' trajectory 150 about the rotating shaft 128. The mass 120 circularly rotates about the rotating shaft 128 while the rotating shaft 128 rotatably oscillates about a main shaft 202 (the oscillation being generated by the centrifugal force (Fc) generated by the mass rotating about the rotating shaft 128). Accordingly, an effective elliptic trajectory 150 essentially refers to a non-continuous 360° 'elliptical' trajectory with effective eccentric varying radius, when projected on a same plane perpendicular to the rotating shaft 128.

Figure 2:
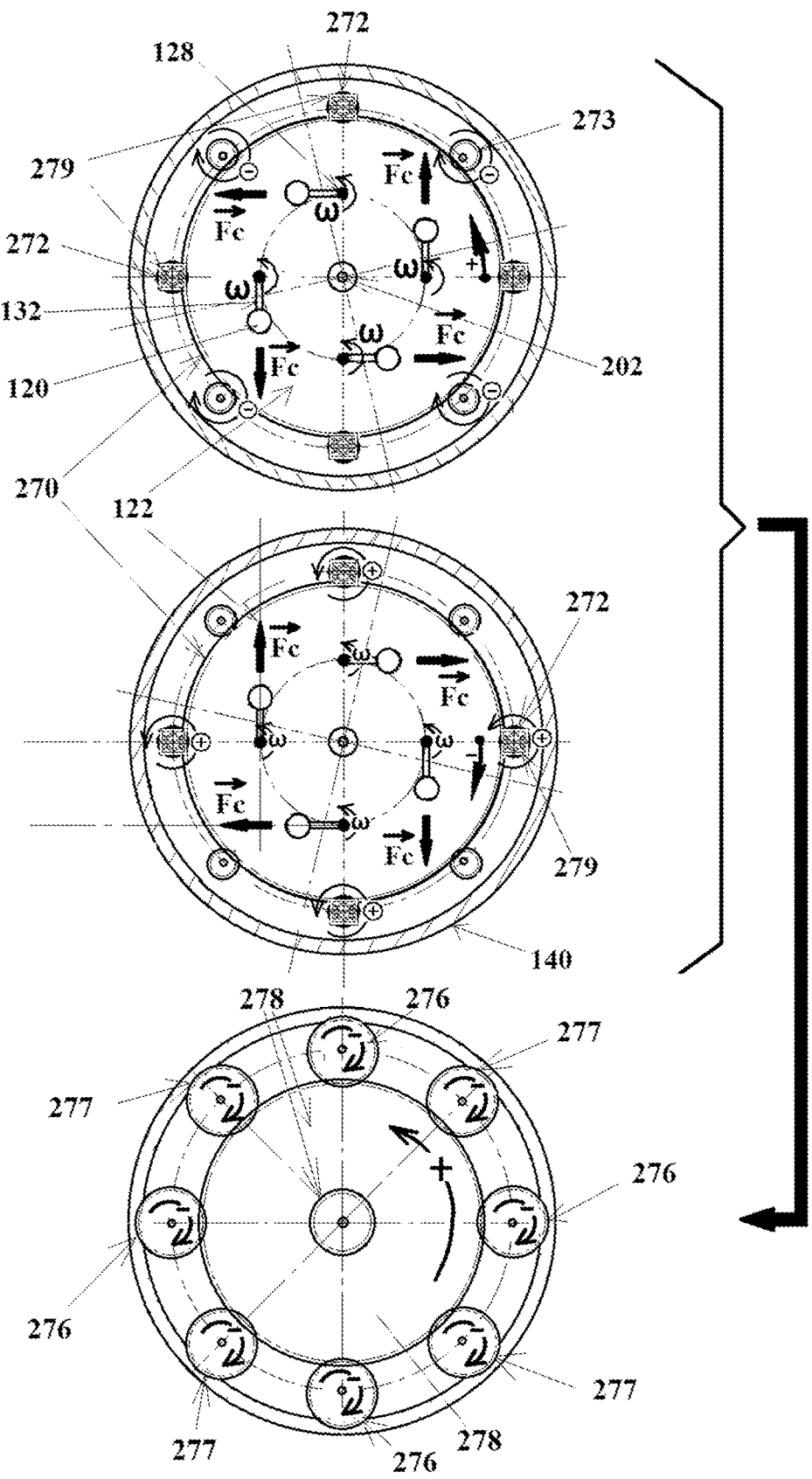
FIG. 2 are schematic views of one the lower pates of the MGCFEET (110) of FIG. 1 when rotating in both rotational directions, with a corresponding top plan view showing the rotation of the intermediate gears and output gear.
Figure 3:
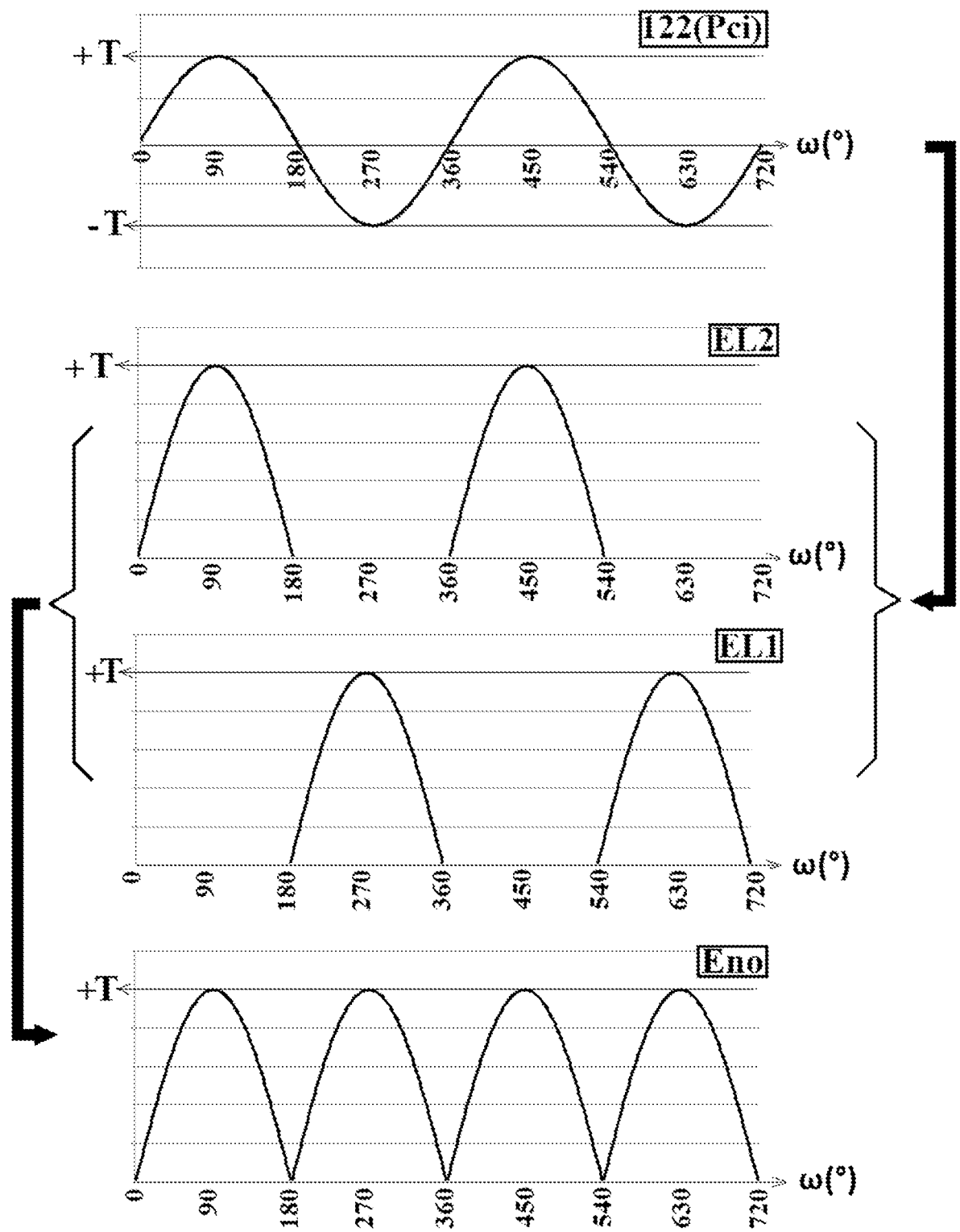
FIG. 3 are schematic diagrams of the typical curve of the output torque generated by all four (4) GCFEETs (100) of a same lower plate (122, 122') of FIG. 2, with the typical oscillating sinusoidal torque curve generated at the lower plate (122, 122') being separated by the two series of free wheel sprockets (272, 273) as shown by the following two curves, and then recombined at the output gear as shown by the last curve.

As Illustrated in FIGS. 1 and 2, we designate a "generator of centrifugal forces from an effective elliptic trajectory" (GCFEET) 100 as the subset of a machine generating centrifugal forces from effective elliptic trajectory (MGCFEET) 110 that typically includes a body (or chassis) 140 of any shape, circular or other, a mechanical energy transmission mechanism (including gear mechanisms, crankshaft mechanisms, torque orientation inverters, rotational direction reversing members or the like) transmitting the energy from the centrifugal forces (Fc) to the output of the machine MGCFEET 110.

In FIGS. 1 to 4, there is shown an embodiment of a machine generating centrifugal forces from effective elliptic trajectory (MGCFEET) 110 with oscillating rotational movement in accordance with the present invention. The MGCFEVR 110 using eight (8) generators of centrifugal forces from effective elliptic trajectory (GCFEETs) 100 and having rotationally oscillating rotating shaft plates or tower plates 122 with an oscillating rotation motion instead of a continuously rotating motion in a same direction. In the embodiment shown, there are a top first lower plate 122 and a bottom second lower plate 122', as shown in FIG. 1.

In this embodiment, the rotating shafts 128 are freely rotatably mounted on their respective lower plate 122, 122' via bearing blocks, four (4) per lower plate 122, 122'. Each rotating shaft 128 carries an eccentric mass system 130, such as a pair of masses 120, one mass 120 on each side of the respective lower plate 122, 122' (for top-bottom symmetry purposes, in order to improve smoothness and avoid shaft vibrations during operation of the machine 110), fixedly connected to the rotating shaft 128 via a respective radial bar 121 or the like. Each lower plate 122, 122' is freely rotatably mounted on the main shaft 202.

The rotation of each rotating shaft 128 via a shaft driving system such as a motor 182 or the like rotating the main shaft 202, the main gears 185 (one per lower plate 122, 122') fixedly mounted on the main shaft 202, and the respective gears 136, driving the respective eccentric mass system 130, applies centrifugal forces having a direction depending on the position of the pair of masses 120, thereby forcing the lower plate 122, 122' to rotatably oscillate about the main shaft 202 in both rotational directions over a predetermined oscillation angle (β). With alt of the masses 120 of the eccentric mass systems 130 simultaneously oriented in the same angular direction relative to the main shaft 202, the value of the torque acting on the lower plate 122, 122', due to the centrifugal forces (Fc) has a sinusoidal shape in the tangential (or circumferential) direction, as shown in the first curve '122(Pci)' of FIG. 3 (with arbitrary min and max torque values +T and −T). The oscillation angle (β) can typically be determined by a plate circumferential (tangential) biasing mechanism (which could be provided with adjustable tension if desired) such as at least one, but preferably four (4), limiting tension coil springs 280 or the like freely hingeably connected between the respective lower plate 122, 122' and the fixed chassis 140. The limiting tension coil springs 280 (not shown in the elevation view of FIG. 1 for clarity purposes), preferably positioned or laying in a plane substantially parallel to the plane of the respective lower plate 122, 122', are shown, in the plan view, in solid lines in their neutral (rest) radial orientation when the centrifugal force (Fc) from the mass 120 is essentially in the radial direction (or at rest) and in dotted lines in their opposite limiting angular positions corresponding to the spanning oscillation angle (β). In addition to enable controlling the span of the oscillation angle (β), the limiting tension coil springs 280 further 'smoothen' the overall output torque (Ct) of the MGCFEET 110.

Typically, the outer periphery of the lower plates 122, 122' include gear teeth 270 or the like in order to drive, via its oscillating motion, series of first 272 and second 273 free wheel sprockets mounted on respective freely rotatable first 274 and second 275 sprocket shafts, as shown in FIGS. 1 and 2. A first series of first free wheel sprockets 272 are adapted to transmit rotating motion of the respective first sprocket shaft 274 in a first rotational direction (as indicated by a solid arrow in the lowermost enlarged detail of FIG. 1) and to freely rotate thereabout in an opposite second rotational direction (as indicated by a stippled arrow in the lowermost enlarged detail of FIG. 1). Inversely, the second series of second free wheel sprockets 273 are adapted to transmit rotating motion of the respective second sprocket shaft 275 in the second rotational direction (as indicated by a solid arrow in the central enlarged detail of FIG. 1) and to freely rotate thereabout in the opposite first rotational direction (as indicated by a stippled arrow in the central enlarged detail of FIG. 1). Preferably, the sprockets 272, 273 and corresponding shafts 274, 275 are mounted into an alternating fashion, and substantially circumferentially equally spaced apart from one another, around the lower plates 122, 122', as shown in FIGS. 1 and 2.

The sprocket shafts 274, 275 carry respective first 276 and second 277 intermediate gear used to transmit the movement and the driving torque to a torque output mechanism or an output gear 278, freely rotatably mounted on the main shaft 202, used to transmit the generated total torque (Ct) to an external load, apparatus or the like.

When oscillating into the second rotational direction (for example negative or clockwise direction of FIGS. 1 to 4), the lower plate 122 drives: 1) the first sprockets 272 into the first rotational direction (positive or counterclockwise direction of our example of FIGS. 1 to 4), which in turn drive the corresponding first sprocket shafts 274 by transmitting its torque thereto. The first sprocket shafts 274 are connected to the respective first intermediate gear 276 via a respective rotational direction reversing member 279 in order to drive the first intermediate gears 276 into the second rotational direction (see first enlarged detail of FIG. 1); 2) the second sprockets 273 into the first rotational direction, which in turn rotate freely about the corresponding second sprocket shafts 275 without transmitting any torque. This makes the first free wheel sprockets 272 and their corresponding first sprocket shafts 274 to transmit only the torque oriented into the second rotational direction, thereby transmitting only the negative portion of the sinusoidal curve, as shown by the 'EL1' curve of FIG. 3.

Alternatively, when oscillating into the first (positive) rotational direction, the lower plate 122 drives: 1) the second sprockets 273 into the second rotational direction, which in turn drive the corresponding second sprocket shafts 275 by transmitting its torque thereto. The second sprocket shafts 275 are directly connected to the respective second intermediate gear 277 in order to drive the second intermediate gears 277 into the second rotational direction; 2) the first sprockets 272 into the second rotational direction, which in turn rotate freely about the corresponding first sprocket shafts 274 without transmitting any torque. This makes the second free wheel sprockets 273 and their corresponding second sprocket shafts 275 to transmit only the torque oriented into the first rotational direction, thereby transmitting only the positive portion of the sinusoidal curve, as shown by the 'EL2' curve of FIG. 3.

Irrespective of the rotational direction of the lower plate 122, all intermediate gears 276, 277 always rotate into a same rotational direction (the second negative direction in the present example of FIGS. 1 to 4). Because of the meshing of the intermediate gears 276, 277 with the output gear 278, the latter always transmits a total torque (Ct) into a same rotational direction (the first positive direction in the present example, as shown by the 'Eno' curve of FIG. 3).

Figure 4:
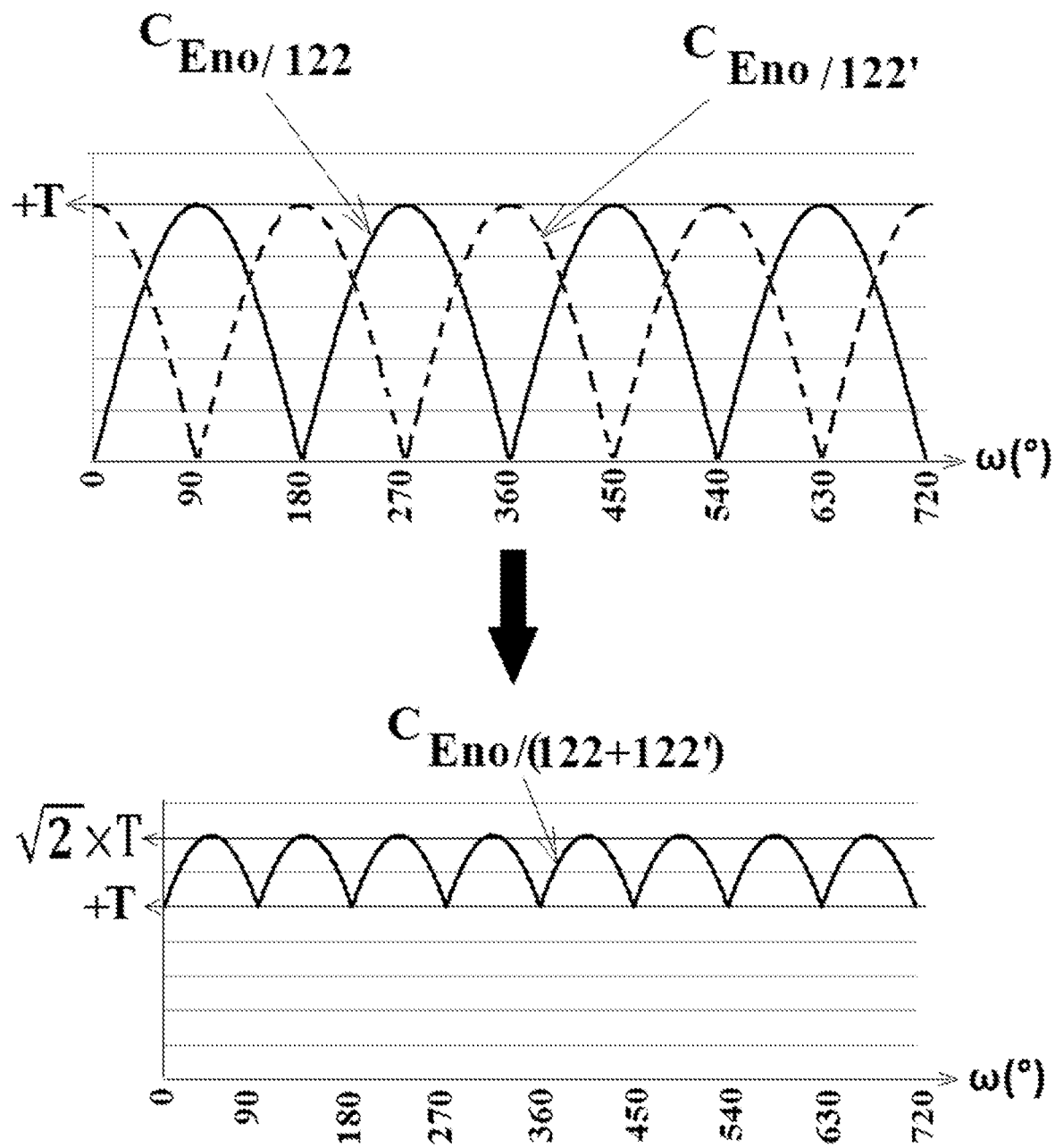
FIG. 4 are schematic diagrams of the typical curves of the separated recombined torque of FIG. 3 for each lower plates as shown by the solid and stippled lines of the first diagram, with the sum of the two curves being shown on the last diagram as the total output torque of the MGCFEET (110) of FIGS. 1.

In order to obtain a more uniform output torque at the output gear 278, the bottom second lower plate 122' has been added with the mass eccentric systems 130 thereof being essentially shifted by an angle θ1 of 90° (π2 radians) relative to the mass eccentric systems 130 of the top first lower plate 122 (as shown in FIG. 1). FIG. 4 shows the two typical curves ($C_{Eno/122}$, $C_{Eno/122'}$) of the output torque generated by the two lower plates 122, 122', in solid and dashed lines respectively (with arbitrary maximum torque value T), with the resulting output torque ($C_{Eno/(122+122')}$) of the sum of the two (with arbitrary maximum torque value T·SQRT(2)). Similarly, if 'n' lower plates are used, the shift angle θ1 of the masses 120 of the mass eccentric systems 130 between successive tower plates 122 would preferably be of 180°/n (π/n radians).

Although four (4) GCFEETs 100 are equally spaced apart on each lower plate 122, 122', any number of GCFEETs 100 could be considered (the more GCFEETs 100, the larger the total output torque Ct), all being generally equally circumferentially spaced apart from one another.

Obviously, the velocity of the rotational angle (ω) of all of the GCFEETs 100 would need to be limited in order to ensure that the mass eccentric systems 130 operate properly, in conjunction with the limiting tension coil springs 280.

Figure 5:
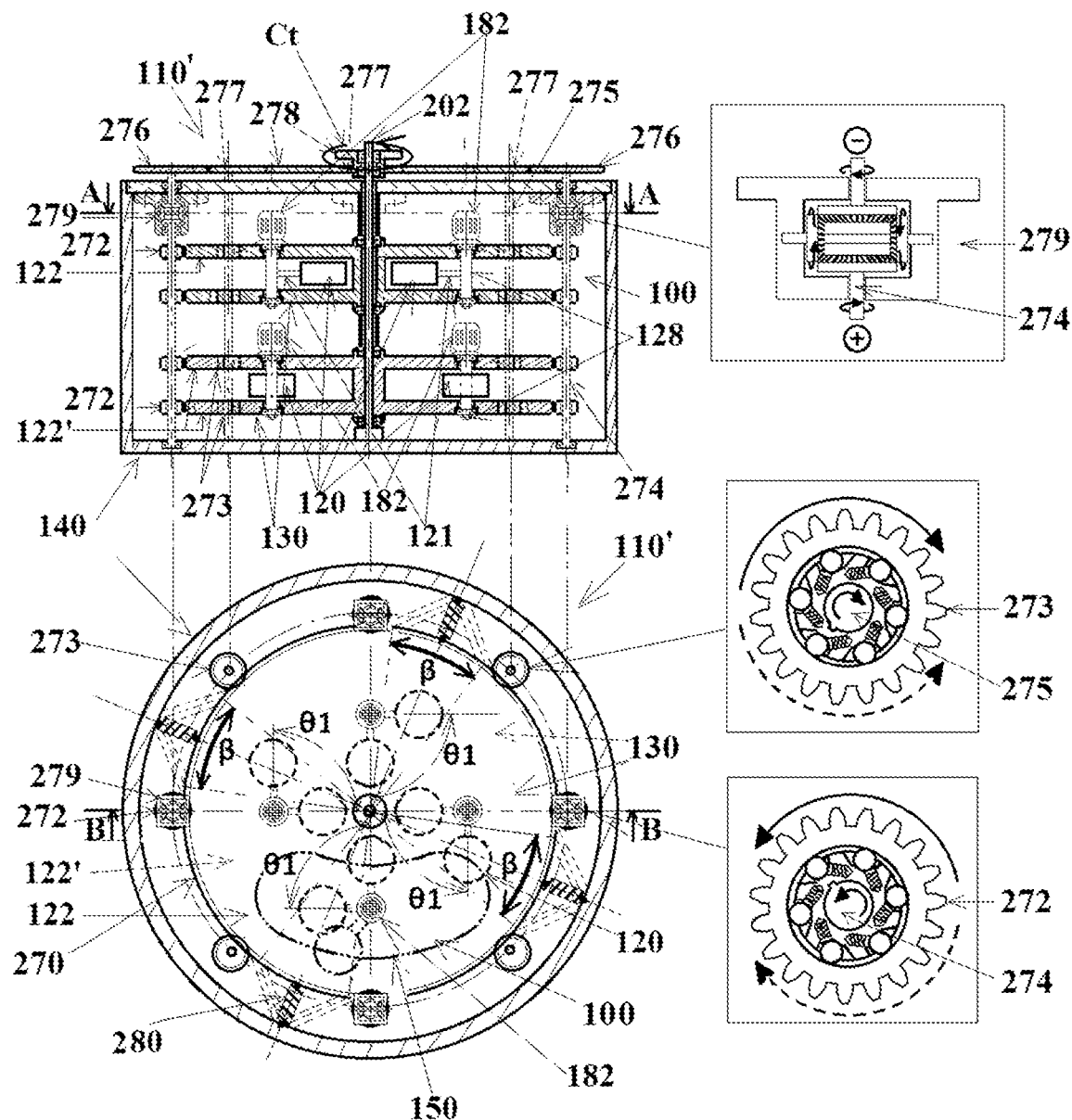
FIG. 5 are schematic plan and elevation views similar to FIG. 1, showing another embodiment of a MGCFEET (110') in which each one of the GCFEETs (100') is powered with a respective motor (182).

Now referring to FIG. 5, there is shown another embodiment 110' of a MGCFEET in accordance with the present invention. The MGCFEET 110', instead of having a single electric motor 182 connected to the plurality of rotating shafts 128 via the main gears 185 and respective gears 186 of embodiment 110, each rotating shaft 128 is driven by a respective motor 182. These motors 182 could be with variable (or constant) output speed. And for ease of implementation (to improve smoothness and avoid shaft vibrations during operation of the machine 110'), each lower plate 122, 122' includes a pair of axially spaced apart united plates (or hollow disk) between which the masses 120 of each mass eccentric system 130 rotate around their respective rotating shafts 128.

One skilled in the art would readily understand that the electrical motor(s) 182 is used to induce the rotation of the rotating shafts 128, which have masses 120 connected thereto that will generate centrifugal forces (Fc) (not directly generated from the power from the motor(s) 182) transmitted to the lower plates 122, 122' which will induce the rotation of the torque output mechanism or output gear 278 to transmit the available output torque (Ct). Although the energy used to power the shaft driving system or motor(s) 182 at the starting comes from an external source (grid, battery, etc.), once the output torque (Ct) becomes sufficiently high, at least a portion of that output torque (Ct) could be used to power an electrical generator (not shown) to now directly power the motor(s) 182 instead of the external source. Furthermore, another portion of the output torque (Ct) is used to compensate all the frictional forces and other lost energy in the MGCFEET 110, while a remaining portion of that output torque (Ct) is available to power any external load.

The MGCFEET 110, 110' can be used 1) to generate electrical energy by having the power torque feeding a electric generator; or 2) as an engine for all types of ground vehicles and others.

To generate mechanical energy under the form of a rotating movement, the MGCFEET 110, 110' exploits a source of energy which:
- is endless;
- is everywhere in the Universe, therefore exploitable outside of the atmospheric environment, and no need of carrying it;
- completely green (without any pollution);
- easy to access;
- usable by everybody;
- free (of charge).

Although the invention described hereinabove and shown in the figures is represented has being into a generally horizontal orientation plane, one having ordinary skills in the art would easily understand that any other plane (non-horizontal) could be considered without deviate from the scope of the present invention.

Furthermore, it would be obvious that many different technical solutions could considerably reduce the different frictional coefficients, and therefore reduce the overall internal resistive work of the machine 110, 110'.

Although not illustrated in the figures (hence not specifically described), it would be obvious to one having ordinary skills in the art that other conceptions of the GCFEET 100 and the MGCFEET 110 could be considered without deviate from the scope of the present invention. As an example, the lower plates 122, 122' could be only a portion(s) of a disk shape.

Although the present invention has been described with a certain degree of particularity, it is to be understood that the disclosure has been made by way of example only and that the present invention is not limited to the features of the embodiments described and illustrated herein regarding the principle of functioning of machines with the principle of the generation of centrifugal forces from eccentrics with variable radius and their applications within machines with rotating movement or linear thrusting force, but includes all variations and modifications within the scope of the invention as hereinabove described and/or hereinafter claimed.

I claim:

1. A generator of centrifugal forces from an effective elliptic trajectory (100) for mounting on a chassis (140) having a main shaft (202) freely rotatably mounted thereon about a main shaft axis and a mechanical energy transmission mechanism mounted thereon, said generator (100) comprising.
  a rotating shaft (128) for freely rotatably mounting about a rotating shaft axis on a rotating shaft plate (122) of the mechanical energy transmission mechanism freely rotatably mounted about the main shaft axis on the main shaft (202), said rotating shaft (128) fixedly connecting to and driving in rotation at least one mass (120) about the rotating shaft axis, said rotating shaft plate (122) and the mechanical energy transmission mechanism being adapted to be displaced in rotational oscillation about the rotating shaft axis by and carry at least a portion of a centrifugal force (Fc) generated by said at least one mass (120) when said at least one mass (120) is displaced in rotation about said rotating shaft (128) to transmit said at least a portion of a centrifugal force (Fc) to a torque output mechanism (278); and
  a shaft driving system (182) selectively driving the rotating shaft (128) and the at least one mass (120) connected thereto.

2. A machine generating mechanical energy by exploiting the generation of centrifugal forces (110) comprising:
- a chassis (140) having a main shaft (202) freely rotatably mounted thereon about a main shaft axis;
- a mechanical energy transmission mechanism mounted on the main shaft (202) about the main shaft axis; and
- at least one generator (100) as defined in claim 1 having said rotating shaft (128) freely rotatably mounting about the rotating shaft axis on the rotating shaft plate (122) of the mechanical energy transmission mechanism, said rotating shaft (128) fixedly connecting to and driving in rotation at least one mass (120) about the rotating shaft axis, said rotating shaft plate (122) and the mechanical energy transmission mechanism being displaced in rotational oscillation about the rotating shaft axis by and carry at least a portion of a centrifugal force (Fc) generated by said at least one mass (120) when said at least one mass (120) is displaced in rotation about said rotating shaft (128) to transmit said at least a portion of a centrifugal force (Fc) to a torque output mechanism (278), said at least one generator (100) including a shaft driving system (182) selectively driving the rotating shaft (128) and the at least one mass (120) connected thereto;

wherein said at least a portion of the centrifugal force (Fc) being available at said torque output mechanism (278) for transmission as an output energy from said machine generating mechanical energy by exploiting the generation of centrifugal forces (110).

3. A machine (110) as defined in claim 2, including a pair of rotating shaft plates (122, 122') freely rotatably mounted onto the main shaft (202) and operatively connecting to the torque output mechanism (278) via a sprocket/gear assembly including first (274) and second (275) sprocket shafts operatively connected to respective first (272) and second (273) wheel sprockets and respective first (276) and second (277) gears of the mechanical energy transmission mechanism, each one of said pair of rotating shaft plates (122, 122') operatively engaging said sprocket/gear assembly when rotating in opposite directions and being operatively disengaged therefrom when rotating in a respective reverse direction, each one of said first sprocket shafts (274) operatively connecting on one said pair of rotating shaft plates (122, 122') including a respective rotational direction reversing member (279), each one of said at least one generator (100) mounting onto a respective one said pair of rotating shaft plates (122, 122') being selectively angularly oriented relative to one another so as to allow said pair of rotating shaft plates (122, 122') to have a rotational oscillating movement about the main shaft (202).

4. A machine (110) as defined in claim 2, further including a plate circumferential biasing mechanism hingeably connecting to the chassis (140) and the rotating shaft plate (122) and biasing the rotating shaft plate (122) into a neutral rotational position of the rotational oscillating movement thereof relative to the chassis (140).

5. A machine (110) as defined in claim 4, wherein the plate circumferential biasing mechanism is at least one tension coil spring (280) laying within a plane substantially parallel to a plane of the rotating shaft plate (122).

6. A machine (110) as defined in claim 3, wherein each plate of said pair of rotating shaft plates (122, 122') including a pair of axially spaced apart united plates receiving respective ones of said at least one mass (120) therebetween.

7. A machine (110) as defined in claim 2, wherein the shaft driving system includes at least one electric motor (182) connecting to and selectively driving the at least one rotating shaft (128).

8. A machine (110) as defined in claim 7, including a plurality of generators (100) with respective said rotating shaft (128), and wherein the shaft driving system includes a plurality of electric motors (182), each one of said plurality of electric motors (182) connecting to and selectively driving a respective said rotating shaft (128).

9. A machine (110) as defined in claim 3, wherein the first (274) and second (275) sprocket shafts, with the respective first (272) and second (273) wheel sprockets and the respective first (276) and second (277) gears of the sprocket/gear assembly of the mechanical energy transmission mechanism being mounted into a circumferentially alternating fashion around the lower plates (122, 122').

10. A machine (110) as defined in claim 9, wherein the first (274) and second (275) sprocket shafts, with the respective first (272) and second (273) wheel sprockets and the respective first (276) and second (277) gears of the sprocket/gear assembly of the mechanical energy transmission mechanism being substantially circumferentially equally spaced apart from one another around the lower plates (122, 122').

11. A machine (110) as defined in claim 3, further including a plate circumferential biasing mechanism hingeably connecting to the chassis (140) and the rotating shaft plate (122) and biasing the rotating shaft plate (122) into a neutral rotational position of the rotational oscillating movement thereof relative to the chassis (140).

12. A machine (110) as defined in claim 11, wherein the plate circumferential biasing mechanism is at least one tension coil spring (280) laying within a plane substantially parallel to a plane of the rotating shaft plate (122).

13. A machine (110) as defined in claim 3, wherein the shaft driving system includes at least one electric motor (182) connecting to and selectively driving the at least one rotating shaft (128).

14. A machine (110) as defined in claim 13, including a plurality of generators (100) with respective said rotating shaft (128), and wherein the shaft driving system includes a plurality of electric motors (182), each one of said plurality of electric motors (182) connecting to and selectively driving a respective said rotating shaft (128).

15. A machine (110) as defined in claim 4, wherein the shaft driving system includes at least one electric motor (182) connecting to and selectively driving the at least one rotating shaft (128).

16. A machine (110) as defined in claim 15, including a plurality of generators (100) with respective said rotating shaft (128), and wherein the shaft driving system includes a plurality of electric motors (182), each one of said plurality of electric motors (182) connecting to and selectively driving a respective said rotating shaft (128).

17. A machine (110) as defined in claim 5, wherein the shaft driving system includes at least one electric motor (182) connecting to and selectively driving the at least one rotating shaft (128), and wherein the machine (110) includes a plurality of generators (100) with respective said rotating shaft (128), and wherein the shaft driving system includes a plurality of electric motors (182), each one of said plurality of electric motors (182) connecting to and selectively driving a respective said rotating shaft (128).

18. A machine (110) as defined in claim 6, wherein the shaft driving system includes at least one electric motor (182) connecting to and selectively driving the at least one rotating shaft (128), and wherein the machine (110) includes a plurality of generators (100) with respective said rotating shaft (128), and wherein the shaft driving system includes a plurality of electric motors (182), each one of said plurality of electric motors (182) connecting to and selectively driving a respective said rotating shaft (128).

19. A machine (110) as defined in claim 6, wherein the first (274) and second (275) sprocket shafts, with the respective first (272) and second (273) wheel sprockets and the respective first (276) and second (277) gears of the sprocket/gear assembly of the mechanical energy transmission mechanism being mounted into a circumferentially alternating fashion around the lower plates (122, 122').

20. A machine (110) as defined in claim 19, wherein the first (274) and second (275) sprocket shafts, with the respective first (272) and second (273) wheel sprockets and the respective first (276) and second (277) gears of the sprocket/gear assembly of the mechanical energy transmission mechanism being substantially circumferentially equally spaced apart from one another around the lower plates (122, 122').

\* \* \* \* \*